United States Patent Office 2,748,102
Patented May 29, 1956

2,748,102

PRODUCTION OF POLYURETHANES USING TRI- OR TETRA-FUNCTIONAL REACTANTS

Guenther Daumiller, Ludwigshafen (Rhine), Germany, assignor to Badische Anilin- & Soda-Fabrik Aktiengesellschaft, Ludwigshafen (Rhine), Germany No Drawing. Application March 18, 1953,
Serial No. 343,230

Claims priority, application Germany March 20, 1952

12 Claims. (Cl. 260—77.5)

This invention relates to a process for the production of polyurethanes by the reaction of polychlorcarbonic acid esters and polyamines.

It is already known that linear polyurethanes can be prepared from di-isocyanates and glycols or from bis-chlorocarbonic acid esters and diamines.

I have found that technically valuable polyurethanes, which have excellent rigidity and dimensional stability can be produced by adding, during the reaction of bis-chlorocarbonic acid esters and diamines, for each mol of one of these bifunctional compounds, 0.005 to 0.1 mol, preferably 0.01 to 0.05 mol, of a trifunctional or tetrafunctional compound capable of reacting with these substances with the formation of polyurethanes. Examples of such tri- or tetra-functional compounds capable of forming polyurethanes are amines containing three or four primary or secondary amino-groups or tri- or tetra-chlorocarbonic acid esters. In the amounts given above, the amount of the tri- or tetrafunctional compounds relates to the amount of the same kind of bifunctional compound; i. e. the amount of tri- or tetra-amine added relates to the amount of diamine used. The total amount of amino-groups is preferably substantially equivalent to the total amount of chlorocarbonic acid ester groups.

Examples of suitable triamines or tetramines are bis-β-aminoethylamine, γ-aminopropyl-ω-aminohexylamine, β-aminoethyl-ε-aminopentylamine, diethylene triamine, bis-N,N'-(γ-aminopropyl)-hexamethylene diamine and N.N'-bis-γ-aminopropyl-para-phenylenediamine. Amines containing in addition to the N no other atoms in the molecule but hydrogen and carbon are preferred. Suitable tri- or tetra-chlorocarbonic acid esters are for example the chlorocarbonic acid esters of glycerine, trimethylolpropane, 1.2.4-butanetriol, 1.3.5-hexanetriol and pentaerythritol.

The tri- or tetra-functional compounds capable of forming polyurethanes may be added to the bifunctional initial materials either singly or in admixture. The mixtures of tri- and/or tetra-functional substances can also contain triamines and/or tetramines together with tri- and/or tetra-chlorocarbonic acid esters at the same time. When tri- or tetra-functional-amines and chlorocarbonic acid esters are present at the same time, the total of these substances, calculated in equivalents, should also be between 0.005 and 0.1 mol to 1 mol of one of the bifunctional polyurethane-forming compounds.

Suitable diamines are for example ethylene diamine, 1.3-propylene diamine, 1.4-tetra methylene diamine, 1.5-pentamethylene diamine, 1.6-hexamethylene diamine, 1.7-heptamethylene diamine, 1.8-octamethylene diamine and also diamines derived from cyclic compounds, such as 1.4-diaminocyclohexane, 2.4-diaminotetrahydrofurane, p.p'-diaminodicyclohexylmethane and the like. Substitution products of the said amines or mixtures of diamines can also be used.

The bis-chlorocarbonic acid esters can be derived from dihydroxy compounds of the general formula

HO—X—OH in which X represents a carbon chain or a cyclic organic radical, which may be interrupted by hetero atoms or hetero-atom groups. Examples of such dihydroxy compounds are ethylene glycol, 1.2-propylene glycol, 1.3-propylene glycol, 1.2-butylene glycol, 1.3-butylene glycol, 1.4-butylene glycol, 2.3-butylene glycol, pentanediols, hexanediols, diglycols, thiodiglycols, cyclohexanediols, 3.4-dihydroxytetrahydrofurane and the like. Mixtures of dihydroxy compounds with bis-chlorocarbonic acid esters may also be used.

The reaction may be carried out in the presence of a solvent or other diluents. Preferably the initial materials, are allowed to act on each other in aqueous medium, preferably in emulsified form. It is advantageous to add to the water indifferent organic solvents which may be miscible or not miscible with water, such as benzene, chlorbenzene, ethylene chloride tetrahydrofurane, dioxane and the like. It is also possible to proceed for example by adding an aqueous solution of the amine mixture and simultaneously adding an acid-binding substance, such as sodium, potassium, ammonium or calcium hydroxide or carbonate, to the bis-chlorocarbonic acid ester emulsified in an aqueous medium. It is also possible, however, first to bring together about equivalent amounts of the bis-chlorocarbonic acid ester and an amine salt mixture and then to introduce the necessary amount of the acid-binding substance. It is preferable to emulsify all the reactants, and the organic solvent present, in the aqueous phase and then to allow an aqueous solution of a compound having a strong alkaline reaction to flow in. It is also possible to prepare an aqueous solution of the amine mixture and to supply to it the bis-chloro-carbonic acid ester, preferably in emulsified form, with simultaneous or subsequent addition of the acid-binding substance.

The most favourable reaction temperatures lie at 5° to 40° C. In order to maintain these temperatures it is necessary to effect cooling during the reaction, because the reaction is exothermic. Towards the end of the reaction it is advantageous to raise the temperature somewhat, for example to 50° to 100° C.

The new polyurethanes are especially suitable for the production of fibres, shaped articles, plates, foils, bristles and the like. During the processing thereof, it is preferable to employ temperatures which lie 10° to 30° C. above the softening point of the polyurethanes in question.

The following examples will further illustrate this invention but the invention is not restricted to these examples. The parts are by weight.

*Example 1*

21.5 parts of 1.4-butanediol bis-chlorocarbonic acid ester and 0.2 part of trimethylolpropane-trichlorocarbonic acid ester, dissolved in 80 parts of benzene, are emulsified together with 18 parts of hexamethylenediamine dihydrochloride in 40 parts of water with the addition of 2 parts of the polyglycol ether of dodecyl alcohol. This emulsion is allowed to flow in a thin stream at 5° to 20° C. into a solution of 17 parts of sodium hydroxide in 150 parts of water while stirring. It is then allowed to react further for 1 hour at room temperature and then for 1 hour at 50° C. and the benzene is then expelled by leading in steam. The polyurethane formed is filtered off by suction, washed and dried. It is a fine white powder which melts at temperatures above 180° C. It is eminently suitable for the production of injection mouldings and stiff bristles.

*Example 2*

A solution of 21.5 parts of the 1.4-butanediol-bis-chloro-carbonic acid ester in 180 parts of carbon tetrachloride is emulsified in a solution of 1 part of an aryl sulfonate, 19 parts of hexamethylenediamine dihydrochloride and 0.3 part of diethylenetriamine trihydrochloride in 50 parts of water. A solution of 17 parts of sodium hydroxide in 150 parts of water is then slowly added to the emulsion while stirring at 10° to 25° C. The product is further treated and worked up as described in Example 1.

*Example 3*

21.5 parts of 1.4-butanediol bis-chlorocarbonic acid ester, dissolved in 100 parts of benzene, are allowed to drip while stirring intensively, into a solution of 11.0 parts of hexamethylenediamine, 0.25 part of diethylenetriamine, 2.0 parts of dibutylnaphthalene-α-sulfonic acid sodium salt and 9.0 parts of sodium hydroxide in 130 parts of water. A reaction temperature of 20° C. is maintained. Working up is effected as in Example 1.

*Example 4*

220 parts of benzene are added to 215 parts of 1.4-butanediol bis-chlorocarbonic acid ester, 100 parts of water are added and the whole emulsified by intensive stirring after the addition of 50 parts of a 25% aqueous solution of a sodium salt of a sulphuric acid ester of reaction products from fatty acid amides and ethylene oxide. Into the resulting emulsion there is allowed to drip, while cooling, an amine mixture of 72 parts of 69% ethylenediamine, 9.3 parts of hexamethylenediamine, 9.1 parts of diaminocyclohexane, 2.1 parts of p.p'-diamino-dicyclohexylmethane and 0.44 part of bis-γ-aminopropylamine, dissolved in 1000 parts of water, the temperature not being allowed to exceed 30° C. The whole is then rendered alkaline by the addition of 1200 parts of 7.5% caustic soda solution. The precipitated polyurethane is filtered off, washed and dried. 190 parts of a white powder which melts at 219° C. are obtained.

*Example 5*

220 parts of benzene are added to 215 parts of 1.4-butanediol bis-chlorocarbonic acid ester and emulsified as in Example 4 in 1000 parts of water. An amine mixture of 61.6 parts of 78% ethylenediamine, 11.6 parts of hexamethylenediamine, 10.8 parts of diaminocyclohexane and 0.58 part of γ-aminopropyl-ω-aminohexylamine, dissolved in 1000 parts of water, are allowed to drip in, and the whole is then made alkaline by the addition of 1200 parts of 7.5% caustic soda solution. A polyurethane is obtained which melts at 216° C.

*Example 6*

215 parts of 1.4-butanediol bis-chlorocarbonic acid ester, after the addition of 220 parts of benzene, are emulsified in water as in Example 1. An amine mixture consisting of 60 parts of 78% ethylene diamine, 11.6 parts of hexamethylenediamine, 11.4 parts of diaminocyclohexane and 1.15 parts of bis-N.N'-(γ-aminopropyl)-hexamethylenediamine (NH₂(CH₂)₃NH(CH₂)₆NH(CH₂)₃NH₂)

dissolved in 1000 parts of water, is allowed to drip in. The solution is then made alkaline with 1200 parts of 7.5% caustic soda solution. After washing and drying, 188 parts of a polyurethane which melts at 217° C. are obtained.

*Example 7*

215 parts of 1.4-butanediol-bis-chlorocarbonic acid ester and 2 parts of trimethylolpropane-trichlorocarbonic acid ester are mixed with 400 parts of benzene and the mixture is emulsified with 1000 parts of water as described in Example 4. To this emulsion a mixture of 116 parts of hexamethylene diamine and 2 parts of diethylene triamine dissolved in 500 parts of water is added dropwise with vigorous stirring. 1400 parts of 7.5 percent caustic soda solution are then dropped in while maintaining a temperature of 5° to 30° C. and the resulting polyurethane  is processed as indicated in the preceding examples. The polyurethane melts at a temperature above 180° C.

What I claim is:

1. A process for the production of polyurethanes having an improved rigidity and dimensional stability which comprises reacting in major amount, a diprimary aliphatic diamine with a bis-chlorocarbonic acid ester in the presence of an acid binding agent, and in minor amount a compound having functionality greater than two, selected from the class consisting of aliphatic triamines, aliphatic tetraamines, tris-chlorocarbonic acid esters, and tetrakis-chlorocarbonic acid esters, said tri- and tetraamines containing on every nitrogen atom at least one hydrogen atom, the molar ratio of the major reactants to the minor reactants being 1:0.005 to 0.1, and the total amount of amino groups being substantially equivalent to the total amount of chlorocarbonic ester groups.

2. A process for the production of polyurethanes having an improved rigidity and dimensional stability which comprises reacting in major amount, a diprimary aliphatic diamine with a bis-chlorocarbonic acid ester in aqueous medium in the presence of an inorganic acid binding agent, and in minor amount a compound having functionality greater than two, selected from the class consisting of aliphatic triamines, aliphatic tetraamines, tris-chlorocarbonic acid esters and tetrakis-chlorocarbonic acid esters, said tri- and tetraamines containing on every nitrogen atom at least one hydrogen atom, the molar ratio of the major reactants to the minor reactants being 1:0.005 to 0.1, and the total amount of amino groups being substantially equivalent to the total amount of chlorocarbonic ester groups.

3. A process as claimed in claim 2 wherein the reactants are emulsified in an aqueous medium.

4. A process as claimed in claim 2 wherein the aqueous medium contains further an indifferent organic solvent.

5. A process for the production of polyurethanes having an improved rigidity and dimensional stability which comprises reacting in major amount, a diprimary aliphatic diamine with a bis-chlorocarbonic acid ester of 1,4-butanediol in aqueous medium in the presence of an inorganic acid binding agent, and in minor amount a compound having functionality greater than two, selected from the class consisting of aliphatic triamines, aliphatic tetraamines, tris-chlorocarbonic acid esters and tetrakis-chlorocarbonic acid esters, said tri- and tetraamines containing on every nitrogen atom at least one hydrogen atom, the molar ratio of the major reactants to the minor reactants being 1:0.005 to 0.1, and the total amount of amino groups being substantially equivalent to the total amount of chlorocarbonic ester group.

6. A process for the production of polyurethanes having an improved rigidity and dimensional stability which comprises reacting in major amount, hexamethylenediamine with a bis-chlorocarbonic acid ester of 1,4-butanediol in aqueous medium in the presence of an inorganic acid binding agent, and in minor amount a compound having functionality greater than two, selected from the class consisting of aliphatic triamines, aliphatic tretraamines, tris-chlorocarbonic acid esters and tetrakis-chlorocarbonic acid esters, said tri- and tetraamines containing on every nitrogen atom at least one hydrogen atom, the molar ratio of the major reactants to the minor reactants being 1:0.005 to 0.1, and the total amount of amino groups being substantially equivalent to the total amount of chlorocarbonic ester groups.

7. A process for the production of polyurethanes having an improved rigidity and dimensional stability which comprises reacting in major amount, a diprimary aliphatic diamine with a bis-chlorocarbonic acid ester in aqueous medium in the presence of an inorganic acid binding agent, and in minor amount, an aliphatic triamine containing on every nitrogen atom, at least one hydrogen atom, the molar ratio of the major reactants to the minor reactants being 1:0.005 to 0.1, and the total amount of amino groups being substantially equivalent to the total amount of chlorocarbonic ester groups.

8. A process for the production of polyurethanes having an improved rigidity and dimensional stability which comprises reacting in major amount, hexamethylene diamine with a bis-chlorocarbonic acid ester of 1,4-butanediol in aqueous medium in the presence of an inorganic acid binding agent, and in minor amount an aliphatic tetraamine containing on every nitrogen atom at least one hydrogen atom, the molar ratio of the major reactants to the minor reactants being 1:0.005 to 0.1, and the total amount of amino groups being substantially equivalent to the total amount of chlorocarbonic ester groups.

9. A process for the production of polyurethanes having an improved rigidity and dimensional stability which comprises reacting in major amount, a diprimary aliphatic diamine with a bis-chlorocarbonic acid ester in aqueous medium in the presence of an inorganic acid binding agent, and in minor amount, a tris-chlorocarbonic acid ester, the molar ratio of the major reactants to the minor reactants being 1:0.005 to 0.1, and the total amount of amino groups being substantially equivalent to the total amount of chlorocarbonic ester groups.

10. A process for the production of polyurethanes having an improved rigidity and dimensional stability which comprises reacting in major amount, a diprimary aliphatic diamine with a bis-chlorocarbonic acid ester in aqueous medium in the presence of an inorganic acid binding agent, and in minor amount, a tetrakis-chlorocarbonic acid ester, the molar ratio of the major reactants to the minor reactants being 1:0.005 to 0.1, and the total amount of amino groups being substantially equivalent to the total amount of chlorocarbonic ester groups.

11. A process for the production of polyurethanes having an improved rigidity and dimensional stability which comprises reacting, in major amount, (1) hexamethylene diamine with (2) the bis-chlorocarbonic acid ester of 1,4-butanediol in aqueous medium, in the presence of an inorganic acid binding agent and, in minor amount, (3) diethylenetriamine, the molar ratio of (2):(3) being 1:0.005 to 0.1, and the total amount of the amino group of (1) being substantially equivalent to the total amount of chlorocarbonic acid ester groups of (1)+(3).

12. A process for the production of polyurethanes having an improved rigidity and dimensional stability which comprises reacting, in major amount, (1) hexamethylene diamine with (2) the bis-chlorocarbonic acid ester of 1,4-butane-diol in aqueous medium in the presence of an inorganic acid-binding agent and, in minor amount (3) the tris-chlorocarbonic acid ester of tri-methylol-propane; the molar ratio of (2):(3) being 1:0.005 to 0.1, and the total amount of the amino group of (1) being substantially equivalent to the total amount of chlorocarbonic acid ester groups of (2)+(3).

References Cited in the file of this patent

UNITED STATES PATENTS

| 2,531,392 | Breslow | Nov. 28, 1950 |

FOREIGN PATENTS

| 892,361 | France | Jan. 7, 1944 |
| 69,283 | Denmark | May 30, 1949 |

OTHER REFERENCES

Bayer Angewandte Chemie, A, 59th year, No. 9, September 1947, pages 257 and 263.

De Bell et al.: German Plastics, German Plastics Practice, Springfield, Mass., 1946, pages 300 to 304.